United States Patent [19]

Koshimo

[11] Patent Number: 4,735,297

[45] Date of Patent: Apr. 5, 1988

[54] DAMPER DISC OF A THIN TYPE

[75] Inventor: Masahiko Koshimo, Osaka, Japan

[73] Assignee: Kabushiki Kaisha Daikin Seisakusho, Osaka, Japan

[21] Appl. No.: 915,909

[22] Filed: Oct. 7, 1986

Related U.S. Application Data

[63] Continuation of Ser. No. 622,518, Jun. 20, 1984, abandoned.

[30] Foreign Application Priority Data

Jun. 23, 1983 [JP] Japan .................................. 58-114077

[51] Int. Cl.[4] .......................... F16H 45/02; F16D 3/66
[52] U.S. Cl. .................................. 192/3.29; 192/106.2; 464/68
[58] Field of Search .................... 192/3.28, 3.29, 3.3, 192/3.31, 106.1, 106.2; 464/67, 68

[56] References Cited

U.S. PATENT DOCUMENTS

| | | | |
|---|---|---|---|
| 4,027,757 | 6/1977 | Radke et al. ....................... | 464/68 X |
| 4,188,805 | 2/1980 | Fall et al. ....................... | 192/106.2 X |
| 4,465,172 | 8/1984 | Gatewood ....................... | 192/106.2 |
| 4,526,260 | 7/1985 | Schierling ....................... | 192/106.2 |
| 4,576,260 | 3/1986 | Koshimo ....................... | 192/106.2 X |
| 4,588,058 | 5/1986 | Aliouate ....................... | 192/106.2 |
| 4,592,459 | 6/1986 | Weissenberger et al. ....... | 192/106.2 |

FOREIGN PATENT DOCUMENTS 1482639  8/1977  United Kingdom ............. 192/106.2

Primary Examiner—Rodney H. Bonck
Attorney, Agent, or Firm—Armstrong, Nikaido, Marmelstein & Kubovcik

[57] ABSTRACT

The present invention discloses a damper disc of a thin type comprising a central hub provided with a hub flange, two side plates coaxially disposed at both sides of the hub flange, and torsion springs engaged in openings provided respectively in the hub flange and the side plates to circumferentially elastically connect the hub flange and the side plates together, characterized in that the hub flange is provided with openings, in which both side plates are closely fixed together with circumferential spaces between the openings and the closely fixed portions of the side plates.

1 Claim, 3 Drawing Sheets

DAMPER DISC OF A THIN TYPE

This application is a continuation of application Ser. No. 622,518 filed June 20, 1984 and now abandoned.

FIELD OF THE INVENTION

The present invention relates to a damper disc of a thin type suitable to be disposed in a narrow space in a torque converter or the like.

DESCRIPTION OF THE PRIOR ART

A conventional damper disc is illustrated in FIG. 1. A hub flange 102 having a spline 101 at the inner periphery is fitted slidably in a direction parallel to a center line $O_1-O_1$ to an outer spline 116 formed at a flange 115 of a central output hub (not shown). A pair of side plates 103 and 104 are disposed at both sides of the radially outer portion of the hub flange 102. The flange 102 and the side plates 103 and 104 are provided at the axially registering portions with circumferentially spaced plural sets of openings 105, 106 and 107, in which circumferentially extending torsion springs 108 are disposed in compressed condition. Further, a piston plate 109 functioning also as a pressure plate is disposed beside the plate 103. The plates 103 and 104 and the piston plate 109 are rigidly fixed by circumferentially spaced pins 110 parallel to the center line $O_1-O_1$. The pins 110 are slidably fitted in circumferentially long apertures 111 formed in the hub flange 102, respectively. At numeral 112 is indicated a facing and at 113 are indicated friction members.

According to the above structure, in such a case that the disc is disposed in a torque converter, the pins 110 may contact with a protrudent portion, which causes such a disadvantage that a sufficient slide stroke can not be obtained.

SUMMARY OF THE INVENTION

With the above disadvantage in view, an object of the invention is to provide a damper disc of which axial length is reduced so that the whole structure may be compact and the disc may be disposed in a narrow space in a torque converter or the like without a disadvantage such as unsufficient operation.

In order to attain the above object, the disc of the invention comprises a central hub having a hub flange, two side plates coaxially disposed at both sides of the hub flange, and torsion springs engaged in openings provided respectively in the hub flange and the side plates to circumferentially elastically connect the hub flange and the side plates together, and characterized in that the the hub flange is provided with openings, in which both side plates are closely fixed together with circumferential spaces between the opening and the closely fixed portions of the side plates.

DETAILED DESCRIPTION OF THE INVENTION

Figure 2:
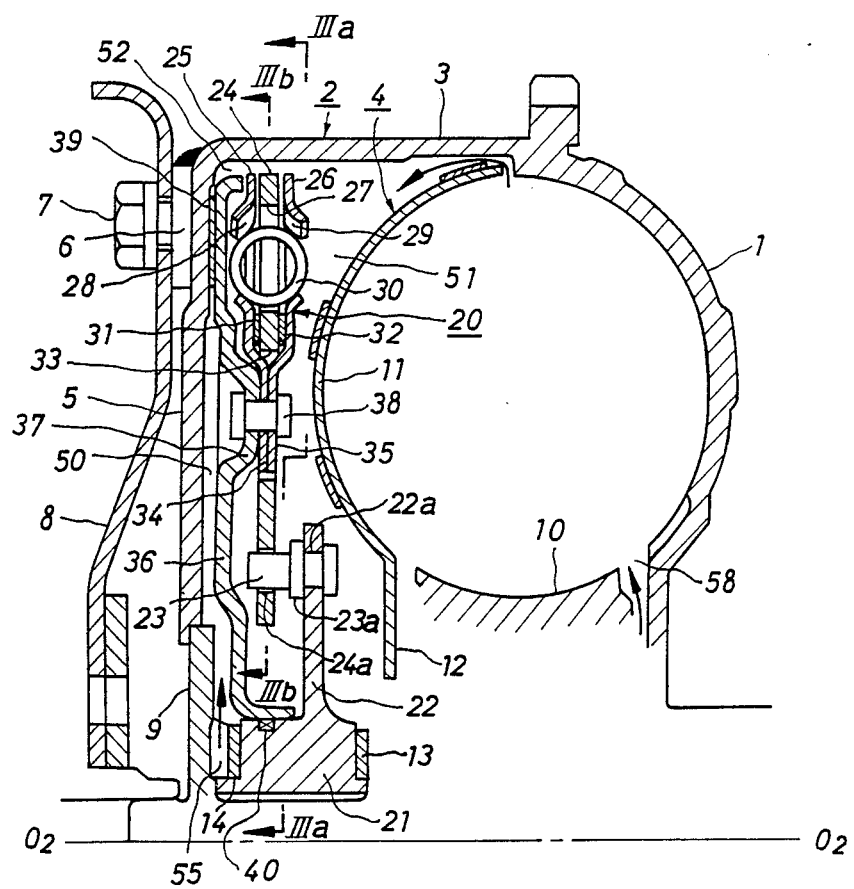
FIG. 2 is a longitudinal sectional partial view of a damper disc according to the invention used as a lockup clutch in torque converter.

Referring to FIG. 2, a pump impeller 1 having a center line $O_2-O_2$ is welded at the outer peripheral portion to a cylindrical outer wall 3 of a front cover 2. The cover 2 is provided with an annular end wall 5 covering a rear side (opposite side to the pump impeller 1) of a turbine runner 4. Plural nut-like bosses 6 welded to the radially outer portions of the end wall 5 is fixed by bolts 7 to a drive plate 8 connected to a flywheel of an engine (not shown). An annular boss 9 is welded to the inner periphery of the end wall 5. The inner periphery of the boss 9 is welded to a guide shaft (not shown). At numeral 10 is indicated a stator carried by a cyrindrical stationary shaft (not shown) through an one-way clutch. The turbine runner 4 facing to the pump impeller 1 is provided at the rear side with a shell 11. The shell 11 is provided at the inner peripheral portion with an annular flange 12 connected to an output shaft (not show). The other end of the output shaft is connected to an input part of a transmission.

A damper disc 20 for a lockup clutch coaxial to the center line $O_2-O_2$ is disposed between the shell 11 and the annular end wall 5. A spline hub 21 is disposed at the center of the disc 20 and between the annular boss 9 and a hub (not shown) of the turbine runner 4. The hub 21 is designed to be splined to the output shaft and is integrally provided at the outer periphery with an annular inner flange 22. Base ends of pins 23 which are parallel to the center line $O_2-O_2$ and projecting toward the end wall 5 are fixed to the radially outer portion of the flange 22. Each pin 23 has a substantially cylinddrical shape and is provided at the middle portion with an integral flange 23a. The flange 22 is provided with apertures 22a. From the left in FIG. 2, the pins 23 are inserted to the flanges 23a into the apertures 22a, respectively. The base end of each pin 23 is caulked to rigidly fix the pin 23 to the flange 22. The tip ends (left ends in FIG. 2) of the pins 23 support a radially inner portion of an annular outer flange 24 coaxial to the center line $O_2-O_2$. Namely, the flange 24 is provided at the radially inner portion with apertures 24a parallel to the center line $O_2-O_2$, into which the pins 23 are fitted to support the flange 24 slidably only in the direction along the center line $O_2-O_2$. Annular side plates 25 and 26 are disposed at both sides of the radially outer portion of the flange 24. The flange 24 and the plates 25 and 26 are provided at the portions facing together with circumferentially long openings 27, 28 and 29 of substantially square shape, in which coil springs 30 (torsion springs) extending circumferentially are engaged. Annular friction members 31 and 32 (a wave spring, a friction washer or the like) for generating a hysteresis torque are disposed radially inside the openings 27, 28 and 29 and compressively beteen the flange 24 and the side plates 25 and 26. The flange 24 is provided radially inside the members 31 and 32 with circumferentially extending openings 33. Both side plates 25 and 26 are provided with radially inwardly projecting tongues 34 and 35 of substantially square shape which are bent and inserted into the openings 33. The tongues 34 and 35 are layed together in the openings 33 and has a same total thickness as the flange 24, so that they are not projecting from the openings 33 in the axial direction parallel to the center line $O_2-O_2$. An annular piston plate 36 is disposed between the side plate 25 and the annular end wall 5. The piston plate 36 is provided at the middle portion with projections 37 which are rigidly caulked to the tongues 34 and 35 by pins 38 parallel to the center line $O_2$—$O_2$. An annular facing 39 is fixed to the radially outer portion of the piston plate 36 and is faced to the end wall 5. The inner periphery of the piston plate 36 is slidably supported through a seal ring 40 to the outer peripheral surface of the spline hub 21.

Figure 3:
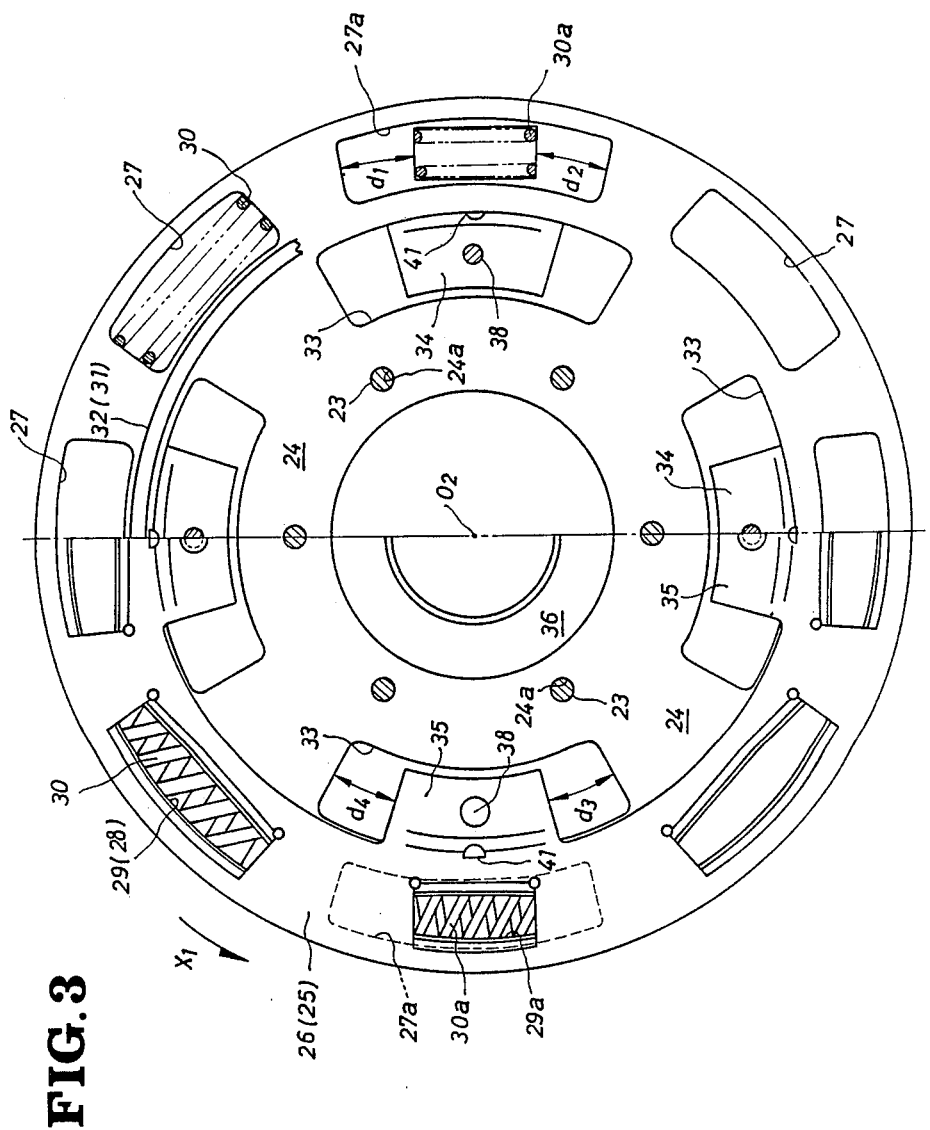
FIG. 3 is a schematic sectional view of which left and right halves are sections respectively taken along lines IIIa—IIIa and IIIb—IIIb in FIG. 2.

As apparent from FIG. 3, the apertures 24a in the radially inner portion of the outer flange 24 are formed on a same circle with circumferentially equal spaces therebetween and are six in number. The six pins 23 are respectively fitted into the apertures 24a. The openings 27 in the radially outer portion of the flange 24 are formed on a same circle with circumferentially equal spaces therebetween and are eight in number. Diametrally aligned two (27a) of the openings 27 are circumferentially longer than the others. The openings 29 and (28) of the side plates 26 and (25) are formed on a same circle with substantially and circumferentially equal space therebetween, and are faced to the openings 27, respectively. Diametrally aligned two openings 29a (only one is illustrated) which face to the openings 27a have circumferentially short length. The springs 30 extending circumferentially are compressively disposed in the openings 27, 29 and (28). In the neutral position, both ends of each spring 30 contact with the radil edges of the openings 27, 29 and (28). However, springs 30a in the openings 27a and 29a are short and contact with the edges of the openings 29a. Therefore, in the neutral position, circumferential spaces $d_1$ and $d_2$ are formed between both ends of the springs 30a and the edges of the openings 27a, respectively. The openings 33 formed in the flange 24 radially inside the openings 27 are formed on a same circle with equal spaces therebetween and are four in number. Spaces d3 and d4 are formed between the radial edges of the openings 33 and the tongues 34 and 35 in the openings 33. The tongues 34 and 35 are provided at the circumferentially middle and radially outer end portions with projections 41 which are formed by a press and project toward the flange 24 for centering the friction members 32 and (31).

Referring to FIG. 2, hydraulical chambers 50 and 51 are formed at both sides of the piston plate 36. An annular space 52 is formed between the piston plate 36 and the outer wall 3 of the cover 2. When the facing 39 is pressed to the end wall 5 as illustrated, it closes the space 52 to the chamber 50 beside the end wall 5. The boss 9 at the inner peripheral portion of th end wall 5 is provided with an oil passage 55 connected to the chamber 50. The passage 55 is connected through a passage (not shown) in the output shaft and a control valve to a hydraulic source. An oil passage 58 connected to the chamber 51 is formed between the pump impeller 1 and the stator 10. The passage 58 is connected through an oil passage (not shown) and a control valve to a hydraulic source. Said control valves are connected to a hydraulic pressure control device having sensors such as a sensor for sensing a degree of opening of an accelator. The control device adjusts the opening of the control valves to relatively change the hydraulic pressures in both chambers 50 and 51. For example, when the rotation speed ration of the pump impeller 1 and the turbine runner 4 approaches to a value of 1:1, the control device operates to increase the hydraulic pressure in the chamber 51.

The operation will be described hereinafter. In FIG. 2, when said hydraulic pressure control device relatively increases the pressure in the chamber 51 to force the piston plate 36 toward the end wall 5, the members of the disc 20 associated to the outer flange 24 move along the pins 23 toward the end wall 5, so that the facing 39 is pressed to the end wall 5. Thus, the front conver 2 and the hub 21 is directly connected through the disc 20 (the clutch is engaged), and the torque from the flywheel is transmitted through the end wall 5, the facing 39, the side plates 25 and 26, the springs 30, the outer flange 24, the pins 23, the inner flange 22 and the hub 21 to the output shaft.

Figure 1:
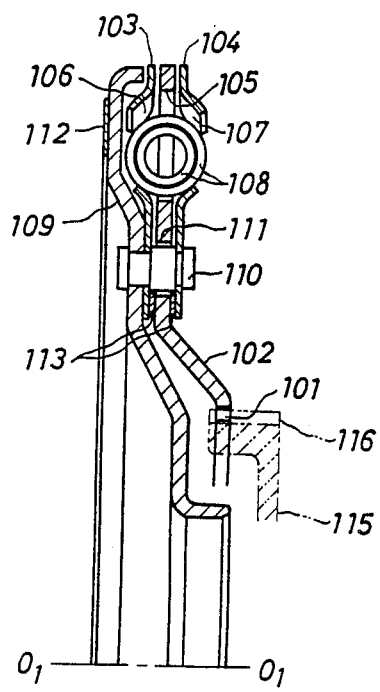
FIG. 1 is a longitudinal sectional partial view of a conventional damper disc.
Figure 4:
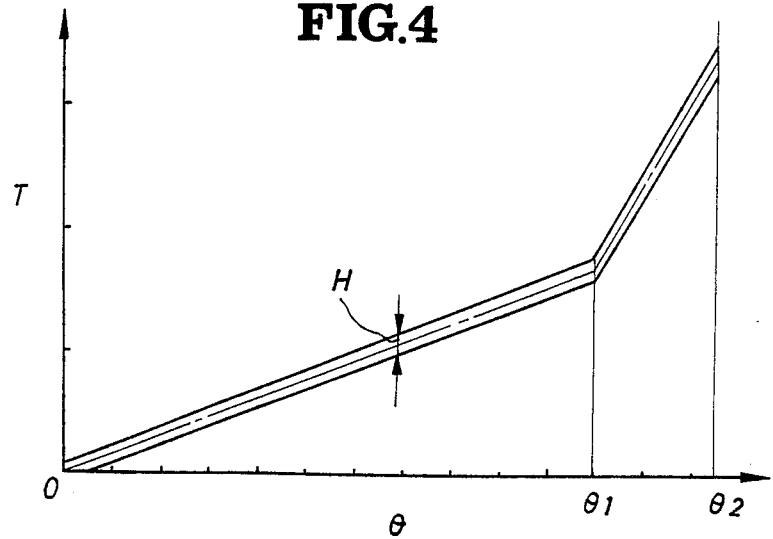
FIG. 4 is a graph showing a torsion angle-torsion torque characteristic.

In this operation, if the torsion torque in a direction of an arrow $X_1$ in FIG. 3 is generated in the piston plate 36 with respect to the central hub 21, the damper disc 20 absorbs the torsional vibration by the following operation. The torsion in the direction of the arrow $X_1$ is transmitted from the piston plate 36 through the pins 38 to the side plate 25 and 26, so that the plates 25 nd 26 twist or torsionally turn in the direction ($X_1$). FIG. 4 shows a characteristic between the torsion angle $\theta$ and the torsion torque T in this operation. Referring to FIG. 4, the torsion angel $\theta$ is a value from 0 to $\theta_1$, by virtue of the spaces $d_1$, the springs 30a do not operate and only the other springs 30 are compressed. At the angle of $\theta_1$, the space $d_1$ decreases to zero and the springs 30a contact the edges of the openings 27a. Thereafer, all of the springs 30 operate. In this operation, the spaces $d_3$ between the openings 33 and the tongues 35 also continuously decrease. At an angle of $\theta_2$, the spaces $d_3$ decreases to zero and the openings 33 and the tongues 34 and 35 contact together. This angle of $\theta_2$ is a maximum torsion angle. In a return operation from the angle of $\theta_2$, the members operate reversely to the above operation. In these operations, friction of the friction members 31 and 32 generate a hysteresis torque H, which absorbs the vibration.

Although not illustrated in FIG. 4, when the members torsionally turn in the reverse direction to the arrow $X_1$, they operate similarly as and reversely to the above operation. In this reverse operation, the members operate to reduce the spaces $d_2$ and $d_4$ to zero.

When said hydraulic pressure control device relatively reduces the pressure in the chamber 51, the piston palte 36 is forced to return by the pressure in the chamber 50, so that the members associated to the outer flange 24 move along the pins 23 toward the turbine runner, and thus, the facing 39 moves away from the end wall 5 to disengage the lockup clutch. In this condition, the power of the engine is transmitted from the pump impeller 1 through the operating oil to the turbine runner 4 and then to the output shaft.

According to the invention, as described hereinbefore, the damper disc 20 comprises a central hub 21 having a hub flange 24, two side plates 25 and 26 coaxially disposed at both sides of the hub flange 24, and torsion springs (e.g., coil springs 30) engaged in the openings 27, 28 and 29 provided respectively in the hub flange 24 and the side plates 25 and 26 to circumferentially elastically connect the hub flange 24 and the side plates 25 and 26 together, and is chracterized in that the hub flange 24 is provided with the openings 33, in which both side plates 25 and 26 are closely fixed together with the circumferential spaces $d_3$ and $d_4$ between the openings 33 and the closely fixed portions of the side plates 25 and 26. Therefore, the thickness of the portions through which the side plates 25 and 26 are connected together can be reduced by a length corresponding substantially to the thickness of the flange 24, so that a sufficient stroke for sliding can be obtained if the disc is disposed in the narrow space in the torque converter, which prevents a disadvantage such as a unsufficient operation and makes the whole structure compact.

The invention may be modified as follows.

(a) Elastic rubber members can be substituted for one, some or all of the springs 30. As a substitution for each coil spring 30, a pair of coaxially arranged coil springs respectively having large and small diameters may be used.

(b) The damper disc 20 according to the invention is not restricted to the use as the lockup clutch of the torque converter. And thus, the piston plate 36 may be eliminated if the disc 20 is not of hydraulic type.

(c) Without bending both of the tongues 34 and 35, one of them may be flat and the other may be bent to be laid on the flat tongue.

(d) The bent portions at the outer peripheries of the tongues 34 and 35 may be used to support the friction members 31 and 32, and the projections 41 may be eliminated.

(e) The openings 33 and the tongues 34 and 35 may be formed radially outside the openings 27, 28 and 29. In this case, the openings 33 may be formed by recesses which open radially outwardly.

(f) The hub 21 may be provided with two parallel inner flanges 22 which support the pins 23 to be fitted into the apertures 24a.

What is claimed is:

1. A damper disc of a thin type comprising a central hub provided with a hub flange, two side plates coaxially disposed at opposite sides of said hub flange, and torsion springs engaged in openings provided respectively in said hub flange and said side plates to circumferentially elastically interconnect said hub flange and said side plate, characterized in that said hub flange is provided with at least one arcuate opening at a radial distance from the center line of said central hub radially inwardly from the torsion spring opening in said hub flange and circumferentially inward of said springs into which flat abutting circumferential portions of said side plates project and are closely fixed together with circumferential spaces between the circumferential ends of said openings and the circumferential ends of said abutting circumferential portions of said side plates, said closely fixed abutting portions of said side plates being rigidly caulked to each other by pins parallel to the center line of said disc, a piston plate, connectable through a friction facing to an input portion of a torque converter, rigidly and coaxially fixed to said abutting and closely fixed portions of said side plates, and said disc is disposed in said torque converter as a lockup clutch.

* * * * *